United States Patent
Buschmann et al.

[11] Patent Number: 5,272,636
[45] Date of Patent: Dec. 21, 1993

[54] CIRCUIT CONFIGURATION FOR A BRAKE SYSTEM WITH ANTI-LOCK OR TRACTION SLIP CONTROL

[75] Inventors: Gunther Buschmann, Griesheim; Norbert Ehmer, Bad Orb; Hans-Joachim Buettner, Hohenahr/Erdar; Van U. Nguyen, Frankfurt am Main, all of Fed. Rep. of Germany

[73] Assignee: Alfred Teves GmbH, Frankfurt am Main, Fed. Rep. of Germany

[21] Appl. No.: 769,308

[22] Filed: Oct. 1, 1991

[30] Foreign Application Priority Data

Oct. 6, 1990 [DE] Fed. Rep. of Germany ....... 4031707

[51] Int. Cl.[5] .............................................. B60T 8/58
[52] U.S. Cl. ........................... 364/426.02; 364/426.03; 303/95; 303/102; 303/105
[58] Field of Search ...................... 364/426.01, 426.02, 364/426.03; 180/197; 303/95-100, 105, 106, 109

[56] References Cited

U.S. PATENT DOCUMENTS

| | | | |
|---|---|---|---|
| 4,809,181 | 2/1989 | Ito et al. | 364/426.01 |
| 4,809,183 | 2/1989 | Eckert | 180/197 |
| 4,844,556 | 7/1989 | Fennel et al. | 364/426.01 |
| 4,844,557 | 7/1989 | Giers | 364/426.02 |
| 4,848,851 | 7/1989 | Kuraoka et al. | 364/426.02 |
| 4,916,619 | 4/1990 | Walenty et al. | 364/426.02 |
| 4,933,858 | 6/1990 | Matsuda | 364/426.02 |
| 4,938,544 | 7/1990 | Braschel et al. | 364/426.02 |
| 5,063,514 | 11/1991 | Headley et al. | 364/426.02 |
| 5,140,524 | 8/1992 | Matsuda | 364/426.02 |
| 5,147,115 | 9/1992 | Leppek et al. | 364/426.02 |

FOREIGN PATENT DOCUMENTS

| | | |
|---|---|---|
| 3413738 | 10/1985 | Fed. Rep. of Germany . |
| 3545716 | 6/1987 | Fed. Rep. of Germany . |
| 3546575 | 10/1987 | Fed. Rep. of Germany . |
| 3612170 | 10/1987 | Fed. Rep. of Germany . |
| 3840456 | 6/1990 | Fed. Rep. of Germany . |
| 9009301 | 8/1990 | Fed. Rep. of Germany . |

Primary Examiner—Gary Chin
Attorney, Agent, or Firm—Robert P. Seitter; J. Gordon Lewis

[57] ABSTRACT

A circuit configuration for a brake system with antilock control and/or traction slip control including circuits (4) for improving the control during cornering. In the presence of a wheel rotational behavior typical of cornering when during a control action the wheel slip, that means the deviation of the wheel speed from the vehicle reference speed, exceeds the slip threshold (SO), this wheel rotational behavior lasting despite reduction of the braking pressure and the deceleration-responsive/acceleration-responsive control thresholds not being attained, the wheel slip is augmented by an offset ($\Delta SO$) for an invariably preset period of time or a period of time which is dependent on the further wheel rotational behavior, on the braking pressure variation and/or other control criteria.

11 Claims, 2 Drawing Sheets

CIRCUIT CONFIGURATION FOR A BRAKE SYSTEM WITH ANTI-LOCK OR TRACTION SLIP CONTROL

BACKGROUND OF THE INVENTION

The present invention relates to a circuit configuration intended for a brake system with anti-lock control and/or traction slip control and serving to improve the control during cornering. A circuit configuration of this type includes sensors for measuring the wheel rotational behavior and electronic circuits for conditioning and assessing the sensor signals as well as for generating braking pressure control signals, wherein the braking pressure is controllable in dependence on the wheel rotational behavior, the vehicle speed or a vehicle reference speed as well as on deceleration thresholds, acceleration thresholds and slip thresholds.

The benefit of an anti-lock system is decisively determined by the quality and the precision of braking pressure control and by this control adapting to the various driving situations, to the condition of the road surface and, respectively, to the instantaneous frictional value between the individual wheels and the road surface. As a result, the control must be devised such that, on the one hand, locking of the wheels is prevented and driving stability and steerability are thereby preserved and that, on the other hand, the stopping distance is minimized to the maximum possible extent. The realization of these demands, in part, leads to contradictory measures because, for example, the driving stability is favored by a freely running or relatively weakly braked wheel, while a short stopping distance can only be obtained by a high amount of brake force. Therefore, the control must be adjusted individually for the single wheels as precisely as possible to a value at which the wheel still runs stably, yet also produces a great brake effect. This can be achieved only if the control unit interprets the rotational behavior of the wheels correctly in every situation and can adapt the pressure variation accordingly.

When the information for controlling the braking pressure is obtained merely by means of wheel sensors, there is need for special measures to detect that a specific rotational behavior is caused by cornering or by an imminent locking of any one wheel. This is because the transversely running wheels fake a slip to the control unit during cornering which, when braking is actually performed, signals prematurely a beginning instability of the wheel. The control of the wheel on the inside of a bend is so-to-speak "biassed" thereby towards the detection of an instability of this wheel, the result being that the braking pressure increase on this wheel is stopped prematurely or, respectively, the braking pressure is decreased prematurely and is kept at too low a value; consequently, insufficient braking forces are applied to the wheel. These effects are increased upon brake circuit failure.

Thus, a number of measures are known to identify cornering and to adapt the control to this condition. The International Patent Application WO 90/09301 teaches a circuit configuration of the above-mentioned type wherein, for the cornering identification, at first a lateral reference speed is formed for each vehicle side, and a difference signal is derived from both lateral reference speeds which, after being combined with the vehicle reference speed, can be assessed for the cornering identification and for adaption of the control to the vehicle behavior during cornering.

SUMMARY OF THE INVENTION

It is an object of the present invention to devise another circuit configuration which also is based on the exclusive use of wheel sensors for obtaining the information required for the control and which can compensate for the disadvantageous influence which the slip that is simulated during cornering has on the braking pressure control.

It has shown that this object can be achieved by a circuitry of the type initially referred to, the special feature of which resides in that during a control action in the presence of a wheel rotational behavior typical of cornering, when the wheel slip and, respectively, the deviation of the wheel speed from the vehicle speed or vehicle reference speed exceeds the slip threshold, when the deceleration/acceleration is relatively small and/or the deceleration-responsive and acceleration-responsive control thresholds are not reached, and when this wheel rotational behavior continues despite braking pressure reduction, a special control action will be performed in that the slip threshold is adapted to be increased by an offset for an invariably preset period of time or for a period of time which depends on the further wheel rotational behavior, on the braking pressure variation and/or on further control criteria.

That is to say, the inventive circuit configuration serves to counteract in a simple fashion that the wheels on the inside of a bend are braked at too low a rate during cornering which considerably improves the control in this situation. A short stopping distance will be attained during cornering even under unfavorable conditions.

According to an embodiment of this invention, the augmentation of the slip threshold sets in after a predetermined filter or delay time which, expediently is in the range of 50 to 100 msecs. Initiation of the special control by exceeding the slip threshold for only a short term is thereby prevented.

In another embodiment of this invention, the offset increases continuously or stepwise, for example, in a working cycle of 5 to 10 msec, until it attains a predetermined maximum value, however, expediently only until the wheel slip reaches the slip threshold increased by the offset.

Further, according to the invention, the offset —as soon as the actual wheel slip reaches the augmented slip threshold—remains constant until the termination of the special control or decreases after a predetermined period of time or based on the wheel rotational behavior, the braking pressure variation etc.

Further features, advantages and possibilities of application of this invention can be taken from the following description of an embodiment and the drawings.

DETAILED DESCRIPTION OF THE INVENTION

Figure 1A:
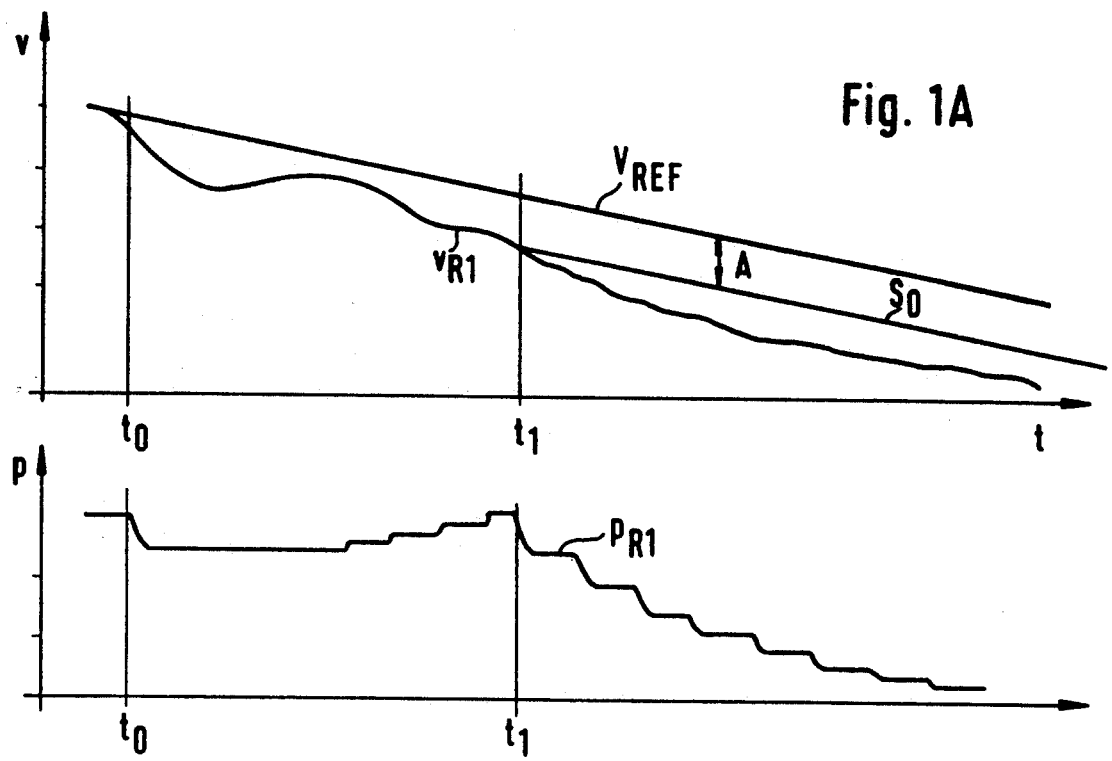
FIG. 1A shows the speed variation and the pressure modulation on a wheel on the inside of a bend controlled by a circuit configuration not having the special control of the present invention.
Figure 1B:
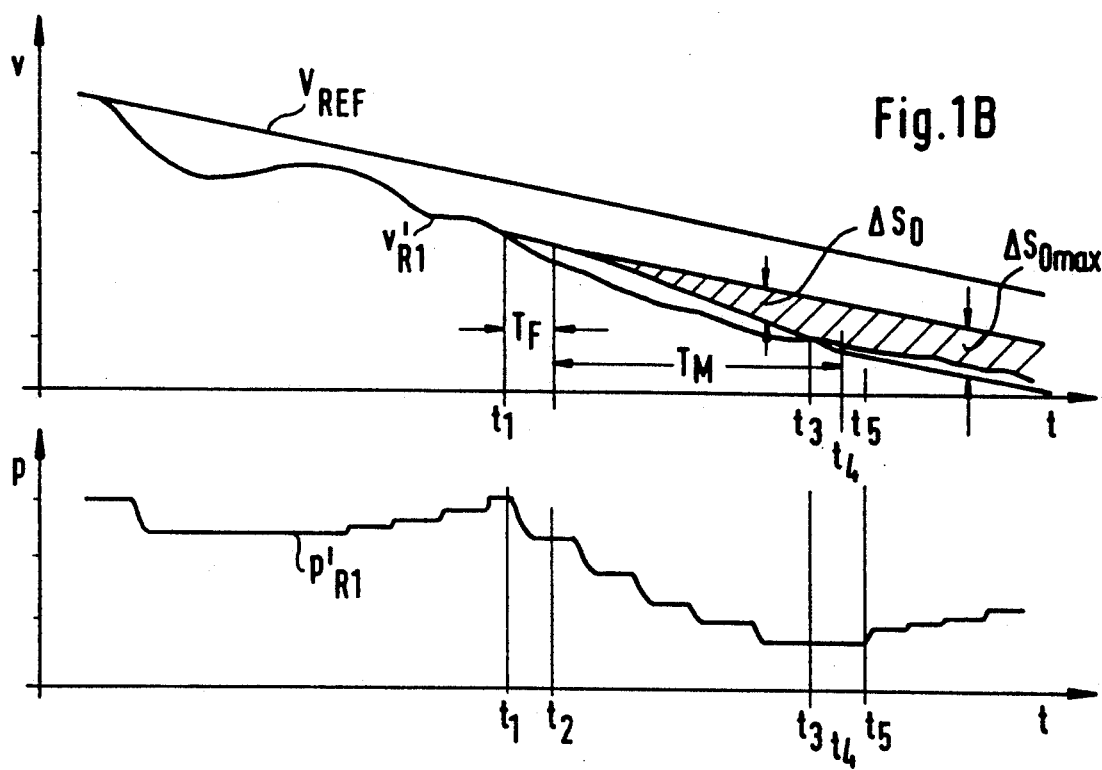
FIG. 1B shows the speed variation and the pressure a wheel on the inside of a bend controlled by a circuit configuration having the special control of the present invention.

FIGS. 1A and 1B illustrate a typical wheel rotational behavior where the special control according to this invention is of use. Both Figures illustrate the time variation of the vehicle reference speed VREF, the rotational behavior and, respectively, the wheel speed vR1, v'R1, the so-called normal threshold slip SO and, the lower curves in FIGS. 1A and 1B, respectively, show the pressure variation pR1 and p'R1 in the wheel brake of the vehicle wheel whose speeds vR1, and v'R1, respectively, is represented in the upper diagram. The example shown concerns the typical rotational behavior of a vehicle wheel on the inside of a bend when driving in a relatively sharp bend and on major braking which results in the commencement of the anti-lock control at the point of time t0. In the time interval from t0 to t1, the control action is governed at first by the deceleration-responsive and acceleration-responsive control and, respectively, by the corresponding control thresholds. However, it becomes apparent starting from the point of time t1 that a wheel rotational behavior typical of cornering prevails. This is because at the point of time t1 the wheel speed VR drops below the characteristic curve SO, whose distance A from the vehicle reference speed VREF represents so-to-speak the maximum permitted brake slip during forward travel. The slip-responsive control will commence when this slip value A and, respectively, the slip threshold SO is exceeded.

Exceeding the slip threshold at the point of time t1 has as a result a major reduction of the braking pressure pR1, p'R1 in the embodiment illustrated herein. Nevertheless, the wheel speed vR1, v'R1 no longer approximates the reference speed VREF, but a high amount of slip remains which is by far in excess of the limit value A. Therefore, pressure continues to decrease according to FIG. 1A. When the wheel whose speed vR1, v'R1 is shown in reality is the wheel on the inside of a sharp bend, this great brake slip is faked only by the angular positioning of this wheel. Consequently, the major, lasting braking pressure reduction is undesirable and causes an unnecessarily long stopping distance.

Therefore, as is shown in FIG. 1B in comparison to Figure lA, a special control is performed according to the present invention as soon as the control recognizes the presence of a wheel rotational behavior typical of cornering. After the slip threshold SO is exceeded at the point of time t1 and a predetermined filter or delay time TF of, for example, 70 msecs has lapsed, the normal slip threshold SO will be augmented by an offset ΔSO. Beginning with the point of time t2, the basic slip threshold SO is augmented quasi continuously—in the present embodiment stepwise after every 7 msecs. Therefore, the wheel speed v'R1 will reach the slip threshold SO+ΔSO augmented by the offset ΔSO at the point of time t3. The pressure reduction will be stopped thereby, and subsequently, starting with the point of time t5, the braking pressure p'R1 in the wheel brake of this wheel on the inside of a bend will be re-increased. Thus, the faked slip is compensated and the range of control in which pressure build-up is possible is extended due to the offset and the corresponding change in the slip threshold. This prevents the wheel on the inside of a bend from braking at too low a rate.

The period of time TM in FIG. 1B designates the maximum period of time during which the augmentation of the offset is continued. A maximum value SOmax is reached at the point of time t4 in the present example. The slip has increased by roughly 10 km/h in excess of the normal slip threshold SO. After the period of time TM, the offset remains constant in this embodiment until the special control is terminated provided this situation continues to prevail.

Figure 2:
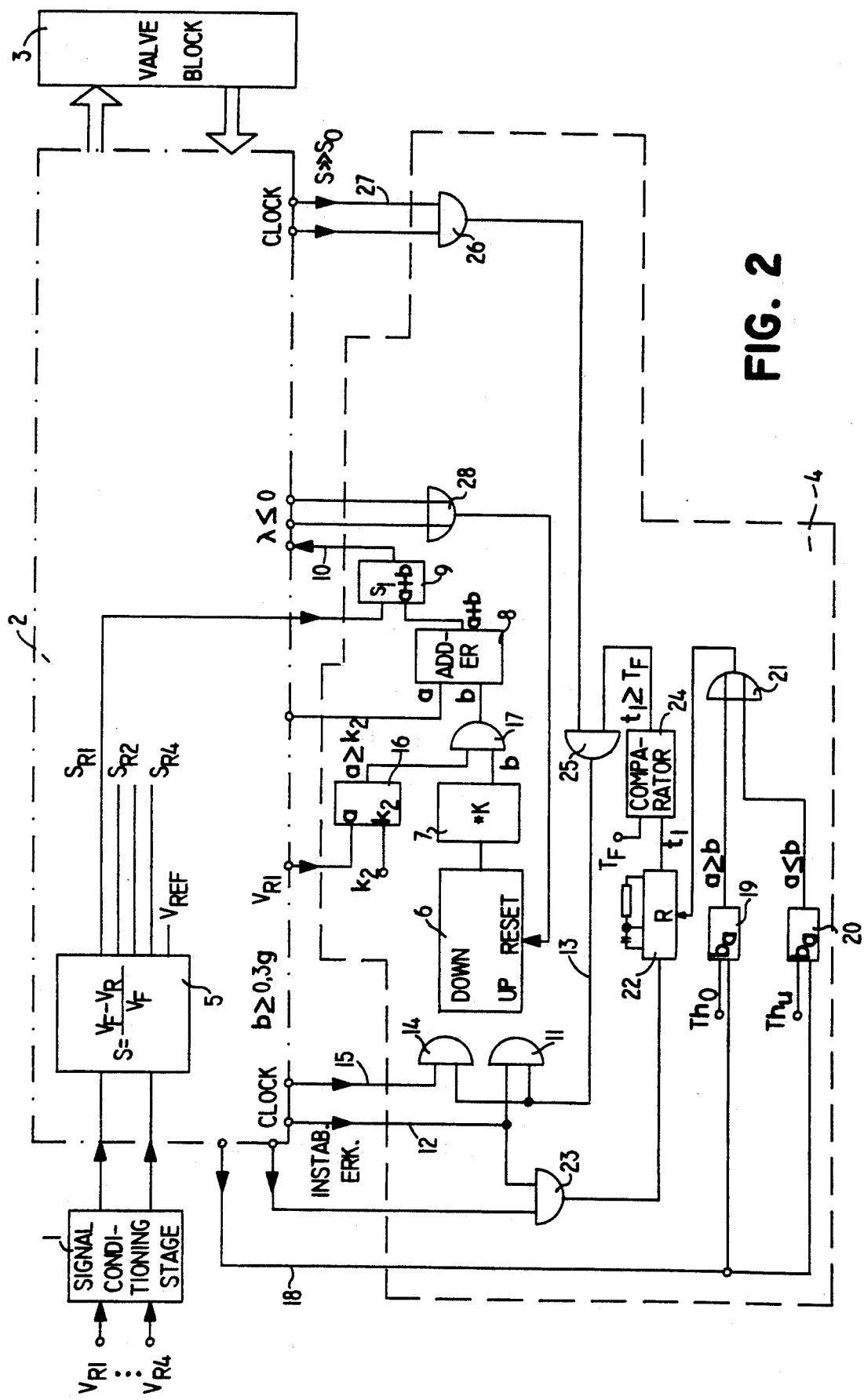
FIG. 2 shows an embodiment of a circuit configuration according to this invention.

The circuit configuration according to FIG. 2 includes a signal-conditioning stage 1 which is supplied with the signals vR1 to vR4 of the individual wheel sensors, a control circuit 2 in a dash-dotted frame, a valve-driver block 3 and an additional circuit 4 in a dash-lined frame. Only one additional circuit is represented herein, although a circuit, identical in principle to the one illustrated, is required for each wheel.

Principally all logic combining and calculating operations, which are necessary to determine the valve control signals to monitor the control etc., are performed in the control circuit 2. What is illustrated symbolically in the interior of the circuit 2 is merely a stage 5 for determining the instantaneous wheel slip S1 to S4, the output SR1 of which leads to the additional circuit 4 and from the additional circuit 4 via a line 10 back to the circuit 2. The slip outlet lines SR2 to SR4 connect to the non-illustrated additional circuits for the other wheels in a corresponding fashion.

The magnitude of the offset signal "b" is determined by means of a digital counter 6. A multiplier 7 is connected downstream of counter 6. The counter's count is multiplied by a constant K in the multiplier 7. The sum of the offset signal "b" and a value "a" derived from the normal slip threshold SO is formed in an adder 8. The sum "a"+"b" is compared with the slip SR1 in a comparator 9, and finally it is signalled to the control unit 2 via a line 10 whether the wheel behavior is instantaneously stable or unstable. This information is assessed in the control unit 2 in a known fashion when the braking pressure control signals are determined or, respectively, when the valves of the valve block 3 are controlled.

The digital counter 6 is reset by an OR-gate 28 when the slip is zero, is positive, or when a pressure increase is initiated via the normal slip thresholds.

On the one hand, the digital counter 6 is activated by an AND-gate 11 which augments the contents of this digital counter 6 when the control unit 2 signals an unstable wheel motion via a line 12 and when simultaneously the working cycle (clk) is applied via a line 13. On the other hand, a wheel acceleration in excess of a limit value (in the present case the filtered wheel acceleration bR1 must be in excess of +0.3g) leads via an AND-gate 14 to the reduction of the counter contents. This is because a relatively great wheel deceleration indicates that the inventive special control is not suitable.

A comparator 16, which compares the wheel speed vR1 with a constant speed k2, and an AND-gate 17 will release the path from the counter 6 to the adder 8 only if the wheel speed vR1 exceeds a minimum value of, for example, 4 km/h.

The inventive special control functions only if the values for the deceleration or acceleration of the wheel are relatively low, that means they lie in a range of roughly +1g or +1.1g. A time stage 22 will be reset via a reset input R in the event that the acceleration or the deceleration is in excess of the above-mentioned relatively low limit values. Time stage 22 is reset via a line 18 and via comparators 19, 20 which are set to an upper and a lower threshold Th0 and ThU, respectively, as well as via an OR-gate 21. The time stage 22 is driven via an AND-gate 23 when the working cycle (clock) is applied and when an unstable wheel rotational behavior is signalled via the line 12. After a predetermined filter or delay time TF (a comparator 24 furnishes an output signal only if the contents of the time stage 22 has risen in excess of the time TF) the digital counter 6 finally is activated via the AND-gate 25 and via the AND-gate 11 with a view to increasing the counter contents. However, the AND-gate 25 is closed via an AND-gate 26 in the absence of a signal on a line 27. The AND-gate 26 will be closed, via line 27, in the presence of great wheel slip which might be caused by an engine stall torque.

What is claimed is:

1. A brake system for a vehicle having wheels, each wheel having a rotational behavior, with anti-lock control and traction slip control for improving control during cornering, said brake system comprising:

means for supplying electrical signals representative of:
   (a) the rotational behavior of the wheels of the vehicle,
   (b) the vehicle reference speed,
   (c) a deceleration threshold,
   (d) an acceleration threshold, and
   (e) a slip threshold;

first circuit means responsive to said electrical signals for:
   (a) identifying wheel rotational behavior typical of cornering,
   (b) generating wheel slip signals representative of the wheel slip, which is the deviation of the wheel speed from the vehicle reference speed, and
   (c) generating valve control signals when at least one of:
      (i) wheel deceleration exceeds the deceleration threshold,
      (ii) wheel acceleration exceeds the acceleration threshold, and
      (iii) the wheel slip exceeds the slip threshold;

a valve block having valves responsive to the valve control signals for controlling pressure fluid flow to and from brakes associated with said wheels;

and second circuit means, exclusively responsive to said wheel slip signals, for increasing the slip threshold by an offset for at least one of:
   (a) an invariably preset period of time, and
   (b) a period of time dependent on further wheel rotational behavior, when:
      (a) the wheel slip exceeds the slip threshold, and
      (b) the wheel acceleration and wheel deceleration are relatively small, and (2) the deceleration and acceleration thresholds are not reached by the relatively small wheel acceleration and said wheel deceleration, and
      (c) said first circuit has identified said wheel rotational behavior typical of cornering.

2. A circuit configuration according to claim 1 wherein said second circuit means include a filter for delaying the increase of the slip threshold offset for a predetermined time delay.

3. A circuit configuration according to claim 1 wherein said slip threshold offset commences after a predetermined time delay.

4. A circuit configuration according to claim 1 wherein said slip threshold offset increases continuously until a predetermined maximum is reached.

5. A circuit configuration according to claim 1 wherein said slip threshold offset increases stepwise until a predetermined maximum is reached.

6. A circuit configuration according to claim 4 wherein said second circuit means includes means for increasing said slip threshold until the wheel slip reaches the slip threshold as modified by the slip threshold offset.

7. A circuit configuration according to claim 5 wherein said second circuit means includes means for increasing said slip threshold until the wheel slip reaches the slip threshold as modified by the slip threshold offset.

8. A circuit configuration according to claim 6 wherein as soon as the wheel slip reaches the slip threshold as modified by the slip threshold offset, said slip threshold offset will remain constant.

9. A circuit configuration according to claim 7 wherein as soon as the wheel slip reaches the slip threshold as modified by the slip threshold offset, said slip threshold offset will remain constant.

10. A circuit configuration according to claim 6 wherein as soon as the wheel slip reaches the slip threshold as modified by the slip threshold offset, said slip threshold offset will decrease: (1) after a predetermined period of time, and (2) in dependence on said rotational behavior of the wheels and on braking pressure variation.

11. A circuit configuration according to claim 7 wherein as soon as the wheel slip reaches the slip threshold as modified by the slip threshold offset, said slip threshold offset will decrease: (1) after a predetermined period of time, and (2) in dependence on wheel said rotational behavior of the wheels and on braking pressure variation.

* * * * *